United States Patent
Lash et al.

(10) Patent No.: US 12,370,500 B2
(45) Date of Patent: Jul. 29, 2025

(54) SYSTEMS AND METHODS FOR FUEL TANK DRAINING AND POLISHING

(71) Applicant: W. L. Gore & Associates, Inc., Newark, DE (US)

(72) Inventors: Daniel Lash, Newark, DE (US); William Napier, Newark, DE (US); Stephen Brouse, Newark, DE (US); Kevin Cresswell, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 862 days.

(21) Appl. No.: 17/414,862

(22) PCT Filed: Dec. 21, 2018

(86) PCT No.: PCT/US2018/067194
§ 371 (c)(1),
(2) Date: Jun. 16, 2021

(87) PCT Pub. No.: WO2020/131107
PCT Pub. Date: Jun. 25, 2020

(65) Prior Publication Data
US 2022/0016578 A1    Jan. 20, 2022

(51) Int. Cl.
*B01D 69/02* (2006.01)
*B01D 17/02* (2006.01)
(Continued)

(52) U.S. Cl.
CPC ............ *B01D 69/02* (2013.01); *B01D 17/02* (2013.01); *B01D 17/12* (2013.01); *B01D 63/00* (2013.01);
(Continued)

(58) Field of Classification Search
None
See application file for complete search history.

(56) References Cited

U.S. PATENT DOCUMENTS

| 4,437,986 A |   | 3/1984 | Hutchins et al. |
|---|---|---|---|
| 4,814,087 A | * | 3/1989 | Taylor .................... F02M 37/34  210/500.21 |

(Continued)

FOREIGN PATENT DOCUMENTS

| CN | 104964902 A | 10/2015 |
|---|---|---|
| JP | 08-334071 A | 12/1996 |

*Primary Examiner* — Clare M Perrin

(57) ABSTRACT

Described herein are systems and methods for liquid phase separation for fuel tanks and other vessels. Particularly, aspects of the present disclosure are directed to a backpressure regulator configured to open when pressure of a mixture upstream of the backpressure regulator exceeds a predetermined setpoint and a hydrophobic membrane upstream of the backpressure regulator and downstream of a first conduit. The predetermined setpoint may be determined by at least a bubble point pressure of the hydrophobic membrane. Additionally, the backpressure regulator may be fluidically connected to and downstream of the first conduit, and to at least one pump operably connected to and upstream of the first conduit and the hydrophobic membrane may be fluidically connected to and upstream of a second conduit. The backpressure regulator may be fluidically connected to and upstream of a third conduit and the third conduit may be downstream the first conduit.

13 Claims, 7 Drawing Sheets

(51) Int. Cl.
    *B01D 17/12*    (2006.01)
    *B01D 63/00*    (2006.01)
    *B01D 67/00*    (2006.01)
    *B01D 71/36*    (2006.01)
    *B60K 15/03*    (2006.01)
    *C10G 33/06*    (2006.01)
(52) U.S. Cl.
    CPC ......... *B01D 67/0025* (2013.01); *B01D 71/36* (2013.01); *B60K 15/03* (2013.01); *C10G 33/06* (2013.01); *B01D 2311/14* (2013.01); *B01D 2313/18* (2013.01); *B01D 2325/38* (2013.01); *B60K 2015/03473* (2013.01)

(56) References Cited

U.S. PATENT DOCUMENTS

| | | | |
|---|---|---|---|
| 5,149,433 A * | 9/1992 | Lien | F02D 33/006 |
| | | | 210/779 |
| 5,204,001 A | 4/1993 | Tonelli et al. | |
| 5,558,774 A | 9/1996 | Tonelli et al. | |
| 6,270,659 B1 * | 8/2001 | Bagci | B01D 35/26 |
| | | | 210/111 |
| 2007/0012624 A1 * | 1/2007 | Bacino | B01D 39/1692 |
| | | | 210/500.36 |
| 2008/0197077 A1 | 8/2008 | Swartley et al. | |
| 2013/0092639 A1 * | 4/2013 | Harp | B01D 17/045 |
| | | | 210/799 |
| 2019/0126210 A1 * | 5/2019 | Qahtan | B01D 67/00793 |

\* cited by examiner

SYSTEMS AND METHODS FOR FUEL TANK DRAINING AND POLISHING

RELATED APPLICATIONS

The present application is a national phase filing under 35 U.S.C. § 371 of International Application No. PCT/US2018/067194, filed on Dec. 21, 2018, the entire contents and disclosures of which are hereby incorporated by reference.

FIELD

The present disclosure relates generally to the field of liquid phase separation, and more particularly to liquid phase separation systems and methods for fuel tanks and other vessels.

BACKGROUND

The presence of water in liquid hydrocarbon fuel causes several problems. In low temperatures, water can freeze and block fuel supply lines. Water can corrode metal components. In high pressure common rail fuel delivery systems water can cause abrasion and wear. Microbial growth can occur when free water is present, plugging fuel filters and creating an acidic condition that corrodes metal components and weakens electrical connections in pumps and fuel gauges that are located inside fuel tanks.

Water contamination in fuel can occur in 3 forms. Free water is bulk water that pools and settles to the bottom of fuel tanks, fuel filter housings, and fuel supply lines due to greater density. Emulsified water is small water droplets that are suspended in bulk fuel since fuel and water are immiscible, and may not settle to the bottom of a fuel containing vessel unless the droplets are big enough or there is sufficient time. Dissolved water is molecular water present in bulk fuel up to the fuel's solubility limit.

Fuel becomes contaminated with water through several pathways. Water can enter tanks through fill ports and vents. Condensation inside tanks can accumulate as free water. Dissolved water can come out of solution when temperatures cool and settle to low points where it pools as free water, which does not go back into solution when temperatures rise.

There are several methods commonly used for removing water contamination from fuel. Settling takes advantage of gravity and time to allow free and emulsified water to pool in the bottom of fuel containing vessels where it can then be drained. Centrifuges are capital intensive mechanically complex systems that accelerate settling by spinning the fuel so that water moves to the outside by centrifugal force where it collects as free water and can be separated out. Coalescers typically use nonwoven hydrophilic filtration media to grow emulsified droplets in size so they become large enough to settle to the bottoms of filtration housings. Barrier separators use hydrophobic filtration media to block free and emulsified water so that droplets settle to filtration housing bottoms. Adsorbents remove water from a fuel stream until the adsorbent becomes saturated.

In all industries and applications that use liquid hydrocarbon fuel, the storage of fuel and the removal of water contamination from the fuel brings with it the likelihood of developing a pool of free water at the bottom of fuel containment vessels, which must be periodically drained. Whether on-vehicle or stationary, fuel storage tanks, fuel filtration housings, and fuel supply lines all have the potential to accumulate free water at low points.

There are generally 2 methods for removing free water from low points in fuel systems, draining and polishing. In draining, a port located at the bottom of the fuel containment vessel is opened allowing water to flow out of the vessel until it is completely gone, then the port is closed. Draining can be done manually or automatically using electronic or float sensors and electronically activated shut off valves. In polishing, the contents of a fuel containment vessel are recirculated through an external pump system containing a polishing filter which removes the water from the main vessel and collects it in a secondary vessel or in an adsorbent.

Manual draining has 3 deficiencies. Since the normal method for assessing whether the liquid being drained is fuel or water is visual inspection, and since these liquids can have similar appearance, it is difficult to know when water has been completely drained, creating the potential for some water to be left in the vessel, or for some fuel to be unnecessarily drained. The process can be labor intensive due to the need to continually check the effluent to see if it is water or fuel. Also, the effluent is unusable waste, so any fuel that is present in the effluent is lost. Adding automation can address these issues, but adds cost for purchasing and installing the sensors and valves, as well as on-going maintenance and calibration. Additionally, electronic sensors monitor a surrogate property such as turbidity, conductivity, or capacitance, and are susceptible to interferences from electrical noise or current leakage, which can make them an unreliable indicator. Similar disadvantages exist for polishing systems.

One example of an application that suffers from these deficiencies is routine drainage of water bottoms from aircraft fuel tanks. The normal procedure is manual drainage of 1-4 liters of liquid from aircraft fuel tank bottoms, generally on a weekly basis. In some cases, the operator drains 1-4 liters from each tank, and does not check to see if it is water or fuel that has been drained. In other cases, the operator drains 1-4 liters from each tank, then checks to see if it is water or fuel by adding food coloring. If the liquid that was drained is water, then additional liquid is drained, until fuel is reached. In all cases, the liquid that has been drained is discarded as waste, with no provisions for recapturing any fuel. There are estimated to be more than 20,000 commercial jets in operation globally, most with at least 3 tanks that have at least 1-4 liters drained out, generally on a weekly basis.

Another example of an application that has unmet needs related to tank drainage is fuel filter housings on refueling trucks used to deliver fuel to planes at airports. When water barrier filters are used in place of adsorbent filters, water collects at the bottoms of those housings. The housings have drain ports but were not designed to be easily drained since they were intended to be used with adsorbents that would hold the water. These housings are normally drained daily but have only a visual check to see if the liquid being drained is water or fuel. A method for easily draining these housings is needed to enable use of water barrier filters in place of adsorbent filters.

Thus, there remains a need for improved fuel tank drainage and polishing. The properties and advantages of the present invention will become apparent to those of skill in the art upon reading the following disclosure.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

An exemplary embodiment of the present disclosure relates to an assembly including a backpressure regulator. The backpressure regulator is configured to open when pressure of a mixture upstream of the backpressure regulator exceeds a predetermined setpoint. The assembly also includes a hydrophobic membrane upstream of the backpressure regulator and downstream of a first conduit, wherein the mixture comprises an organic phase liquid and an aqueous phase and wherein the predetermined setpoint is determined by at least a bubble point pressure of the hydrophobic membrane. The backpressure regulator is configured to be fluidically connected to and downstream of the first conduit, and to at least one pump operably connected to and upstream of the first conduit. The hydrophobic membrane is configured to be fluidically connected to and upstream of a second conduit. The second conduit is configured to transport the organic phase liquid downstream of the hydrophobic membrane. The backpressure regulator is configured to be fluidically connected to and upstream of a third conduit and the third conduit is configured to be downstream the first conduit. The third conduit is configured to transport the water downstream of the backpressure regulator.

In an embodiment, the predetermined setpoint is determined by a combination of the bubble point pressure of the hydrophobic membrane and the airflow of the hydrophobic membrane.

In an embodiment, the determining airflow of the hydrophobic membrane is between 0.92 Fraizer and 40 Frazier.

In an embodiment, the determining bubble point pressure of the hydrophobic membrane is between 20.9 psi and 500 psi.

In an embodiment, the second conduit is fluidically connected to a clean fuel collection vessel.

In an embodiment, the second conduit is fluidically connected to a vessel for the mixture, whereby filtered fuel is returned to the vessel.

In an embodiment, the vessel is selected from a group consisting of a fuel tank, a fuel filter housing, and a fuel supply system.

In an embodiment, the organic phase liquid is selected from a group consisting of a fuel, a biofuel and an insulating oil.

In an embodiment, the backpressure regulating device includes a check valve.

In an embodiment, the backpressure regulating device includes a diaphragm valve.

In an embodiment, the membrane is formed from polytetrafluoroethylene (PTFE).

In an embodiment, the membrane is formed from ePTFE.

In an embodiment, the backpressure regulator is integrated into one of a tank, a pump, or a housing.

In an embodiment, the aqueous phase is a non-dissolved water.

Another exemplary embodiment of the present disclosure relates to a system including a vessel configured to receive a mixture including an organic phase liquid and an aqueous phase. The system also includes a first conduit fluidically connecting the vessel to a hydrophobic membrane. The system further includes at least one pump operably connected to and upstream of the first conduit. The at least one pump is configured to transport a mixture from the vessel to the hydrophobic membrane through the first conduit. The system further includes a second conduit fluidically connected to and downstream of the hydrophobic membrane. The system further includes a third conduit downstream of the first conduit and upstream of the hydrophobic membrane. The system further includes a backpressure regulator fluidically connected to and upstream of the third conduit, and fluidically connected to and downstream of the first conduit. The backpressure regulator is configured to open when pressure of a mixture upstream of the backpressure regulator exceeds a predetermined setpoint determined by at least the bubble point pressure of the hydrophobic membrane.

In an embodiment, the predetermined setpoint is determined by a combination of the bubble point pressure of the hydrophobic membrane and the airflow of the hydrophobic membrane.

In an embodiment, the determining airflow of the hydrophobic membrane is between 0.92 Fraizer and 40 Frazier.

In an embodiment, the determining bubble point pressure of the hydrophobic membrane is between 20.9 psi and 500 psi.

Another exemplary embodiment of the present disclosure relates to a method for draining a vessel containing a mixture comprising an organic phase liquid and an aqueous phase. The method includes transporting the mixture to a filter housing containing a backpressure regulator and a hydrophobic membrane upstream of the backpressure regulator. The method also includes opening the backpressure regulator downstream of the hydrophobic membrane when the pressure of the mixture reaches a predetermined setpoint. The method further includes transporting the aqueous phase away from the hydrophobic membrane and through the backpressure regulator, whereby the aqueous phase is separated from the organic phase liquid. The method further includes transporting the organic phase liquid through the hydrophobic membrane and downstream from the filter housing. The method further includes collecting the organic phase liquid downstream of the filter housing.

In an embodiment, the collecting step includes transporting the organic phase liquid to a clean fuel collection vessel.

In an embodiment, the collecting step includes transporting the organic phase liquid back to the vessel.

In an embodiment, the predetermined setpoint of the backpressure regulator is determined by at least the bubble point pressure of the hydrophobic membrane.

In an embodiment, the predetermined setpoint is determined by a combination of the bubble point pressure of the hydrophobic membrane and the airflow of the hydrophobic membrane.

BRIEF DESCRIPTION OF THE DRAWINGS

The accompanying drawings are included to provide a further understanding of the disclosure and are incorporated in and constitute a part of this specification to illustrate embodiments. Together with the description, the drawings serve to explain the principles of the disclosure. The accompanying drawing figures referred to herein are not necessarily drawn to scale, but may be exaggerated to illustrate various aspects of the present disclosure, and in that regard, the drawing figures should not be construed as limiting.

DETAILED DESCRIPTION

Figure 1:
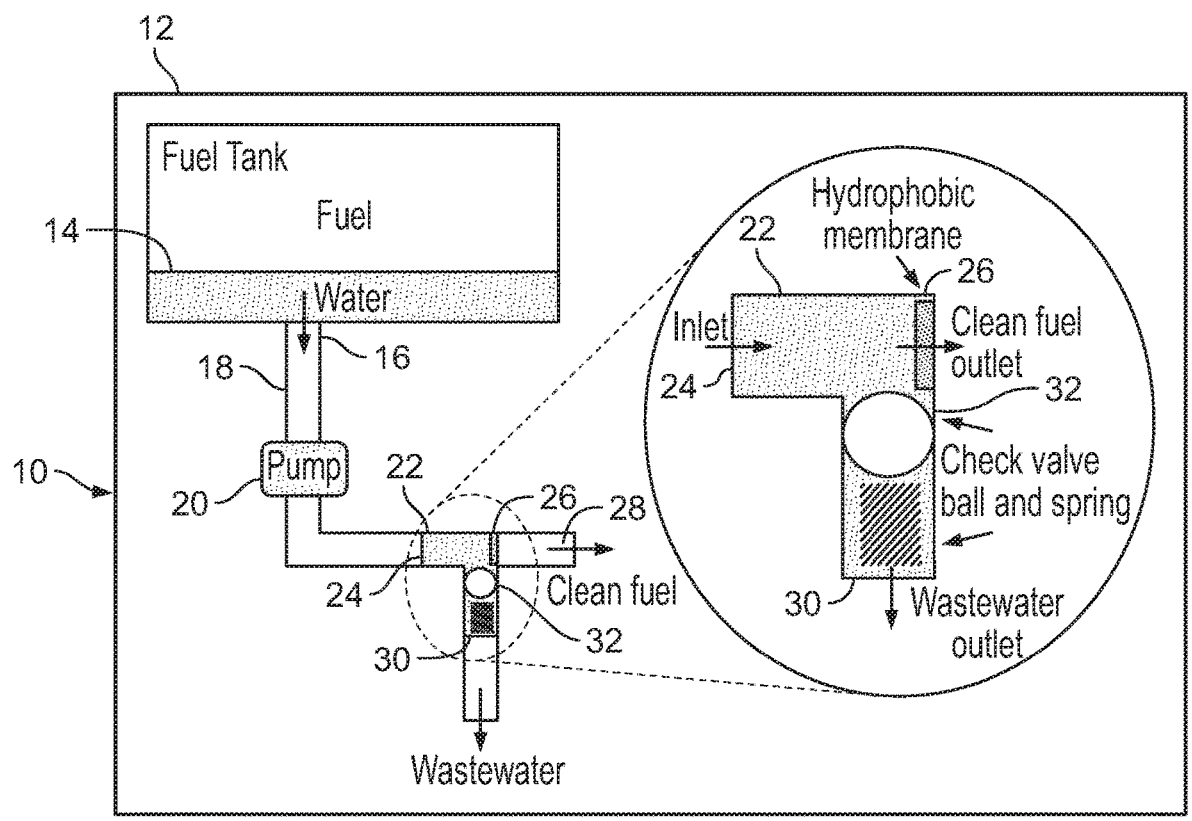
FIG. 1 is a schematic illustration of a fuel tank drainage and polishing system in accordance with embodiments disclosed herein.

Persons skilled in the art will readily appreciate that various aspects of the present disclosure can be realized by any number of methods and apparatus configured to perform the intended functions. It should also be noted that the accompanying figures referred to herein are not necessarily drawn to scale, but may be exaggerated to illustrate various aspects of the present disclosure, and in that regard, the drawing figures should not be construed as limiting.

As discussed in detail below, the fuel tank drainage and/or polishing systems, assemblies and methods of the present disclosure completely (or near completely) drain water out from the bottom of fuel tanks (or fuel filter housings, fuel supply systems or other fuel-containing vessels/systems) without wasting fuel, provide a positive indication when water removal is complete, are simple and inexpensive to install operate and maintain, and are not susceptible to electrical malfunction.

Disclosed herein is a fuel tank draining and/or polishing system and assembly that utilizes a hydrophobic membrane and the pressure that is built up when flow of water is blocked by such a membrane. This system facilitates complete or near complete removal of water from fuel faster than gravity settling and without the risk of breakthrough as can occur with coalescers, and with minimal fuel wastage and minimal operator involvement. The system can be used for either fuel tank drainage or polishing.

Also disclosed herein is a filter housing that includes one or more components of the draining/polishing system, as further discussed below.

The draining/polishing system, assembly and filter housing disclosed herein incorporate a hydrophobic membrane or filter made with a hydrophobic membrane, and a pressure relief valve such as, for example, a spring-loaded ball check valve or diaphragm valve, that functions as a backpressure regulator.

In some embodiments, the system/assembly is separate from a fuel containment vessel. In other embodiments, the system/assembly is incorporated into the fuel containment vessel.

Pressure is created in the system or assembly either by pumping or a pumping/gravity combination. In some embodiments, the pump is part of the drainage/polishing system or assembly. The pump can be any fluid compatible pump that is capable of providing sufficient pressure to activate the pressure relief valve. One example of such a pump would be the GP8 portable 12-volt fuel transfer pump (Part Number 147000-01, 8 gpm flow rate, 10 psi operating pressure) from Great Plains Industries (GPI). In other embodiments, the pumping pressure is provided by the fuel supply system.

The hydrophobic membrane may be made of any hydrophobic material of any pore size that is suitable to meet the flow rate and fuel quality needs of the system or assembly, as further discussed below.

The system, assembly and filter housing disclosed herein include a pressure relief valve (e.g., a backpressure regulator), which is used to turn flow of the water phase on and off by opening when a mixture or solution from the vessel (e.g., fuel tank) builds up line pressure upstream of the valve/regulator, allowing water to be removed, and then closing when line pressure decreases due to permeation of fuel through the hydrophobic membrane.

An exemplary embodiment of a system, assembly and filter housing of the present disclosure is illustrated in FIG. 1. The system 10 includes a vessel 12 such as, for example, a fuel tank, a fuel filter housing or a fuel supply system. The vessel 12 contains a mixture 14 that includes non-dissolved water and an organic phase liquid, such as, for example, fuel, biofuel or insulating oil. Examples of fuels include, but are not limited to, Jet A, Jet A1, JP8, any hydrocarbon fuel meeting ASTM D1655 or ASTM D7566, ASTM D975, ASTM D6751.

In the embodiment illustrated in FIG. 1, the vessel 12 contains the mixture 14, which includes the non-dissolved water and organic phase liquid. The vessel 12 includes a drain port 16. A first conduit, or inlet line, 18 extends from the vessel drain port 16, and a pump 20 is operably connected to the first conduit 18. The first conduit 18 fluidically connects to a filter housing 22 at an inlet 24 thereof. The pump 20 transports the mixture 14 through the first conduit 18 to the inlet 24 of the filter housing 22. In other embodiments, more than one pump may be utilized.

The filter housing 22 contains a hydrophobic membrane 26 that blocks the flow of water but allows the passage of fuel therethrough, into a second conduit, or outlet line, 28 that extends from the filter housing 22, downstream from the hydrophobic membrane 26. In some embodiments, the second conduit 28 is fluidically connected to a clean fuel receiving vessel (not shown). In some embodiments, the second conduit 28 is fluidically connected to the vessel 12, such that the filtered fuel is returned to the vessel 12.

In some embodiments, the hydrophobic membrane 26 is a polytetrafluoroethylene (PTFE) membrane. In some embodiments, the hydrophobic membrane 26 is an expanded PTFE (ePTFE) membrane. Suitable ePTFE membranes include those produced by processes described in U.S. Pat. Nos. 7,306,729 and 4,902,423 and ePTFE membranes described and/or utilized in U.S. Pat. No. 9,480,953 or U.S. Patent Application 2013/0092639 A1 all of which are incorporated herein by reference in their entirety In some embodiments, the hydrophobic membrane 26 has a bubble point pressure greater than 20.9 psi up to 500 psi. In an embodiment, the membrane 26 has a bubble point pressure between 40 psi and 400 psi. In another embodiment, the bubble point pressure is between 50 psi and 300 psi. In another embodiment, the bubble point pressure is between 60 psi and 200 psi. In another embodiment, the bubble point pressure is between 100 and 150 psi. In another embodiment, the bubble point pressure is between 200 and 300 psi. In another embodiment, the bubble pressure is between 300 and 450 psi. In some embodiments, hydrophobic membrane 26 has an airflow greater than 0.92 Frazier up to 40 Frazier. In an embodiment, the hydrophobic membrane 26 has an airflow between 5 and 35 Frazier. In another embodiment, the airflow is between 10 and 30 Frazier. In another embodiment, the airflow is between 15 and 25 Frazier. In another embodiment, the airflow is between 20 and 30 Frazier. These properties of the hydrophobic membrane 26 are further discussed below in the Examples.

The system 10 further includes a third conduit, or vent port, 30 upstream of the hydrophobic membrane 26 and downstream of the first conduit 18. The filter housing 22 also contains a backpressure regulator 32 fluidically connected to and upstream of the third conduit 30. The third conduit 30 and backpressure regulator 32 are positioned intermediate the filter housing inlet 24 and the hydrophobic membrane 26, as illustrated in FIG. 1. In some embodiments, the third conduit 30 leads to a wastewater receptacle (not shown). The pressure differential between the first conduit 18 and third conduit 30 opens the backpressure regulator 32, as further discussed below.

The backpressure regulator 32 includes a pressure relief valve. In some embodiments, the backpressure regulator 32 includes a check valve, such as, for example, a ball and spring assembly, as shown in FIG. 1. For example, the back pressure regulator may be a Fisher MR98 Series Backpressure Regulator, Part Number MR98L (2-38 psi set point) from Emerson. In other embodiments, the backpressure regulator 32 includes a diaphragm valve. For example, the back pressure regulator may be a GSD2 General Service Back Pressure Regulator (0-10 psi set point) from Equilibar. The backpressure regulator 32 is configured to open when the pressure differential between the first conduit 18 and third conduit 30 exceeds a predetermined setpoint between, for example, 5 psi to 150 psi. In some embodiments, this pressure differential is created by the pump 20 and the backpressure regulator 32. Specifically, in an example, the speed of the pump 20 and the pressure of the backpressure regulator 32 are set so that sufficient pressure between the first conduit 18 and the third conduit 30 is created to open the backpressure regulator 32. In yet another embodiment, because the pressure differential is within the above-identified range, no pump is needed. Rather, sufficient pressure between the first conduit 18 and the third conduit 30 may be created by a number of other factors such as, but not limited to, the height of the vessel 12 relative to the backpressure regulator 32, the diameter of the first and second conduits 18, 30, and the flow rate of the mixture 14.

Operation of the exemplary system 10 will now be described. In some embodiments, the speed of the pump 20 and the pressure of the backpressure regulator 32 are set so that when the first conduit 18 and filter housing inlet 24 are filled with the water 16, sufficient pressure exists (e.g., between the first conduit 18 and the third conduit 30) to open the backpressure regulator 32. As discussed above, the backpressure regulator is configured to open when system pressure between the first conduit 18 and the third conduit 30 exceeds a predetermined setpoint between, for example, 5 psi and 150 psi. In an embodiment, the predetermined setpoint is between 10 and 125 psi. In another embodiment, the predetermined setpoint is between 20 and 100 psi. In another embodiment, the predetermined setpoint is between 30 and 75 psi. In another embodiment, the predetermined setpoint is between 40 and 50 psi. In another embodiment, the predetermined setpoint is between 50 and 100 psi. In another embodiment, the predetermined setpoint is between 75 and 150 psi. In another embodiment, the predetermined setpoint is between 100 and 140 psi. In another embodiment, the predetermined setpoint is between 125 and 145 psi.

To begin the draining process, the vessel drain port 16 is opened and the pump 20 is turned on, so that the mixture 14 from the bottom of the vessel 12 (i.e., fuel tank, fuel filter housing, or fuel supply system) begins to drain out, through the first conduit 18 and into the filter housing 22. In an alternate embodiment, gravity is used to begin draining the mixture 14 from the vessel 12. In another alternate embodiment, gravity and the pump 20 are used together to drain the mixture 14 from the vessel 12. In one embodiment, the water in the mixture 14 has fully settled to the bottom of the vessel 12 so that the water drains out before the fuel in the mixture 14 enters the first conduit 18. In another embodiment, the water is emulsified in the fuel, so that water and fuel in the mixture 14 enter the first conduit 18 at the same time.

When the mixture 14 from the vessel 12 tank reaches the hydrophobic membrane 26, the water component therefore is blocked, causing line pressure to build up within the first conduit 18. This pressure opens the valve of the backpressure regulator 32, allowing the water to flow through the backpressure regulator 32 into the third conduit 30. In some embodiments, the water flows through the third conduit 30 and out into a wastewater receptacle (not shown).

While the water in the mixture 14 flows through the third conduit 30 (and into the wastewater receptacle), the fuel in the mixture 14 flows through the hydrophobic membrane 26 and into the second conduit 28. Line pressure within the first conduit 18 decreases, since not all of the mixture 14 being pumped therethrough is blocked by the hydrophobic membrane 26. When line pressure decreases, the valve of the backpressure regulator 32 closes, water ceases to flow into the wastewater receptacle, and fuel continues to flow through the hydrophobic membrane 26. This fuel is essentially clean filtered fuel which can either be captured in a collection vessel (and ultimately used), or pumped directly back in to the vessel 12 that it originally came from. If water accumulates in the first conduit 18 again after the fuel begins to flow through the hydrophobic membrane 26, the cycle will repeat such that the first conduit 18 pressure builds and opens the valve of the backpressure regulator 32, allowing the water to flow to the wastewater receptacle again, until the fuel reaches the hydrophobic membrane 26 again. When the water stops flowing into the wastewater receptacle, this is a positive signal that (i) substantially most of the water has been drained out of the vessel 12 where at least 80%, at least 85%, at least 90%, at least 95%, at least 99% or higher of the free water has been removed; (ii) mostly fuel remains in the vessel 12, and (iii) the pump 20 can be shut off. If the pump 20 continues to operate, all of the fuel in the vessel 12 can be recirculated through the system 10 (including the hydrophobic membrane 26) and polished.

EXAMPLES

The following examples provide various non-limiting embodiments and properties of the present invention. Although certain methods and equipment are described below, other methods or equipment determined suitable by one of ordinary skill in the art may be alternatively utilized.

Figure 2:
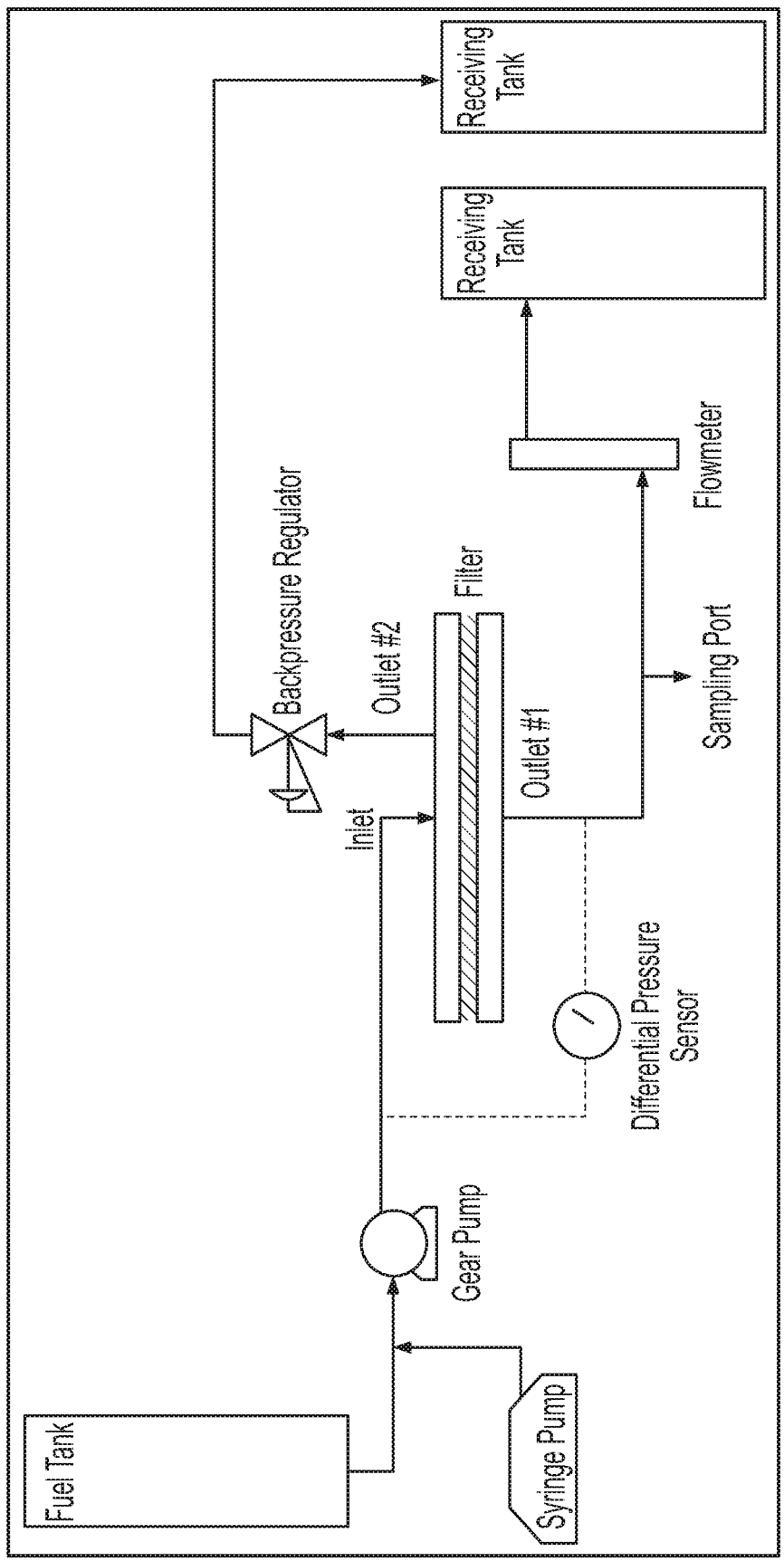
FIG. 2 is a schematic illustration of a fuel tank drainage and polishing system as discussed in the Examples.

An experiment was set up as schematically illustrated in FIG. 2. All tanks were vented to the atmosphere to remain at atmospheric pressure. Jet-A fuel was gravity-fed from a fuel tank to a Micropump model 415A magnetic drive gear pump and controller system. Water was injected using a Cole Parmer model MMR1-010023 syringe pump, which created a fine water-in-fuel emulsion in the gear pump. Water deionized to a resistivity of 18.3 MΩ-cm was used. This emulsion was fed to the inlet port of a Millipore model YY3009000 90 mm stainless steel filter. Outlet #1 was downstream of the membrane. An Orange Research Inc.

model 1201-S1018 differential pressure sensor was used to monitor the pressure difference across the filter. Periodically, samples were drawn by opening a valve on a sample port. The flow was measured using a Cole Parmer model MMR1-090023 flowmeter. The fluid from Outlet #1 was collected in a receiving tank. Outlet #2 was upstream of the membrane. An Emerson Cash Valve Type 10-K 15-75 psi backpressure regulator was connected to Outlet #2. The backpressure regulator acted as a relief vent for water collected upstream of the filter. The cracking pressure is defined as the pressure at which the backpressure regulator opens. The fluid from Outlet #2 was collected in a receiving tank.

All membranes studied were supported inside the filter housing by placing the membrane over two layers of a spunbond polyester with a mass per area of 56 g/m$^2$, an air permeability of 44 Frazier, a thickness of 0.004 inch, a machine direction tensile strength of 25 lbf, and a crossweb tensile strength of 13 lbf.

Materials

Four ePTFE membranes were studied and compared. Their properties are described in Table 1.

TABLE 1

Properties of ePTFE membranes studied.

| Name | Description | Bubble Point (psi) | Airflow (Frazier Number) | Mass per Area (g/m$^2$) |
|---|---|---|---|---|
| LFHB | Low Flow, High Bubble Point | 37.4 | 0.23 | 19.7 |
| HFLB | High Flow, Low Bubble Point | 11.2 | 2.17 | 8.5 |
| HFHB1 | High Flow, High Bubble Point 1 | 62.2 | 3.06 | 9 |
| HFHB2 | High Flow, High Bubble Point 2 | 83.7 | 1.64 | 9 |

Method

The degree of water contamination in fuel was determined using a Gammon Technical Products, Inc. Aqua-Glow Series V Water Detector sampling from the sampling port shown in FIG. 2. The detector was calibrated and operated in accordance with Gammon's published method. Briefly described, the detector is used to measure the amount of undissolved water in kerosene-type jet fuels. A measured sample of fuel is passed through a treated detector pad. Undissolved water in the fuel will react with the detector pad. When the pad is subsequently illuminated by ultraviolet light, the coating that was contacted by free water will fluoresce a bright yellow with the brightness increasing for increasing amounts of free water in the fuel sample. Water content is read out by the detector in parts per million by volume (ppm). With a 500 mL sample size, the instrument can measure 1 to 12 ppm water. For highly contaminated samples, the instrument can measure up to 60 ppm water by reducing the sample size from 500 mL to 100 mL and multiplying the readout by a factor of five.

Immediately prior to membrane testing, jet fuel was pressurized through the system with no water injection, and the water contamination was measured as <1 ppm. The backpressure regulator was set to crack open at 50 psi. The LFHB membrane was then installed in the filter holder. In each test, jet fuel was flowed through the system for 30 seconds and the operator recorded the flow rate. Then, water was injected at a rate of 1 mL/minute. The operator waited another 30 seconds. At this point, the operator recorded the pressure difference across the membrane (dP start) and opened the sampling valve. When the appropriate sample volume was collected, the operator recorded the differential pressure (dP end) and closed the sampling valve. The water contamination was immediately measured. The filter holder was then flushed with fuel to remove any bulk water upstream of the membrane. This test was then repeated for a new flow rate of jet fuel. This procedure was then used for the HFHB1 membrane. This data is shown in Table 2. These tests were completed before the differential pressure reached the 50 psi required to crack open the backpressure regulator.

TABLE 2

Comparison of LFHB membrane and HFHB1 membrane performance.

| Membrane | Fuel Flow (gal/min) | dP start (psi) | dP end (psi) | Sample Volume (mL) | Water Contamination (ppm) |
|---|---|---|---|---|---|
| LFHB | 0.13 | 22 | 30 | 500 | 5 |
| LFHB | 0.18 | 26 | 33 | 500 | 7 |
| LFHB | 0.22 | 40 | 43 | 100 | 20 |
| LFHB | 0.22 | 40 | 46 | 500 | >12 |
| LFHB | 0.04 | 5 | 10 | 500 | 1.8 |
| HFHB1 | 0.04 | 1 | 6 | 500 | 2 |
| HFHB1 | 0.13 | 4 | 7 | 500 | 1.5 |
| HFHB1 | 0.18 | 5 | 9 | 500 | 1.1 |
| HFHB1 | 0.22 | 10 | 15 | 500 | 1.3 |

Because the HFHB1 membrane is more permeable, the pressure difference across the membrane was lower for the same flow rate. To make another comparison of HFHB1 to LFHB, the following experiment was performed. The backpressure regulator was set to crack open at 50 psi. The HFHB1 membrane was then installed in the filter holder. In each test, jet fuel was flowed through the system for 30 seconds and the operator recorded the flow rate. Then, water was injected at a rate of 1 mL/minute. For the given flow rate, the operator waited until the "dP start" pressure matched the corresponding "dP start" pressure for the LFHB membrane. At this point, the operator recorded the pressure difference across the membrane (dP start) and opened the sampling valve. When the appropriate sample volume was collected, the operator recorded the differential pressure (dP end) and closed the sampling valve. The water contamination was immediately measured. The filter holder was then flushed with fuel to remove any bulk water upstream of the membrane. This test was then repeated for a new flow rate of jet fuel. This data is shown in Table 3. These tests were completed before the differential pressure reached the 50 psi required to crack open the backpressure regulator.

TABLE 3

HFHB1 membrane operated at flow and dP corresponding to the LFHB membrane. The dP was increased to the value shown by waiting for water to accumulate upstream of the membrane.

| Membrane | Fuel Flow (gal/min) | dP start (psi) | dP end (psi) | Sample Volume (mL) | Water Contamination (ppm) |
|---|---|---|---|---|---|
| HFHB1 | 0.04 | 4 | 8 | 500 | 1.7 |
| HFHB1 | 0.13 | 22 | 26 | 500 | 1.6 |
| HFHB1 | 0.18 | 25 | 30 | 500 | 1 |
| HFHB1 | 0.22 | 38 | 45 | 500 | 1.1 |

A comparison was also made to a high flow, low bubble point membrane. This test examined the water contamination as the differential pressure increased over time. Immediately prior to membrane testing, jet fuel was pressurized through the system with no water injection, and the water contamination was measured as <1 ppm. The backpressure regulator was set to crack open at 50 psi. The HFLB membrane was then installed in the filter holder. Jet fuel was flowed through the system for 30 seconds and the operator recorded the flow rate. Then, water was injected at a rate of 1 mL/minute. The operator waited another 30 seconds. At this point, the operator recorded the pressure difference across the membrane (dP start) and opened the sampling valve. When the appropriate sample volume was collected, the operator recorded the differential pressure (dP end) and closed the sampling valve. The water contamination was immediately measured and new test pad was installed. Meanwhile, the fuel flow and water injection continued. When the differential pressure increased by a few psi, a new sample was collected following the above procedure. This procedure was then used for the HFHB2 membrane. This data is shown in Table 4.

TABLE 4

The water contamination performance of the HFLB and HFHB2 membranes were measured as dP increased.

| Membrane | Fuel Flow (gal/min) | dP start (psi) | dP end (psi) | Sample Volume (mL) | Water Contamination (ppm) |
| --- | --- | --- | --- | --- | --- |
| HFLB | 0.13 | 5 | 8 | 500 | 1.5 |
| HFLB | 0.13 | 13 | 15 | 100 | 20 |
| HFLB | 0.13 | 16 | 19 | 100 | 40 |
| HFLB | 0.13 | 20 | 20 | 100 | >60 |
| HFLB | 0.22 | 12 | 15 | 500 | 2 |
| HFLB | 0.22 | 15 | 17 | 500 | 8 |
| HFLB | 0.22 | 17 | 20 | 100 | >60 |
| HFLB | 0.22 | 20 | 20 | 100 | >60 |
| HFHB2 | 0.13 | 7 | 10 | 500 | 1.5 |
| HFHB2 | 0.13 | 12 | 16 | 500 | 2 |
| HFHB2 | 0.13 | 19 | 22 | 500 | 1.3 |
| HFHB2 | 0.13 | 25 | 30 | 500 | 1.7 |
| HFHB2 | 0.13 | 34 | 38 | 500 | 2.7 |
| HFHB2 | 0.13 | 46 | 50 | 500 | 1.7 |
| HFHB2 | 0.22 | 17 | 19 | 500 | 2.1 |
| HFHB2 | 0.22 | 21 | 23 | 500 | 1.6 |
| HFHB2 | 0.22 | 25 | 28 | 500 | 2.2 |
| HFHB2 | 0.22 | 30 | 33 | 500 | 1.7 |
| HFHB2 | 0.22 | 38 | 42 | 500 | 2.5 |
| HFHB2 | 0.22 | 47 | 50 | 500 | 1.9 |

Discussion

Figure 3:
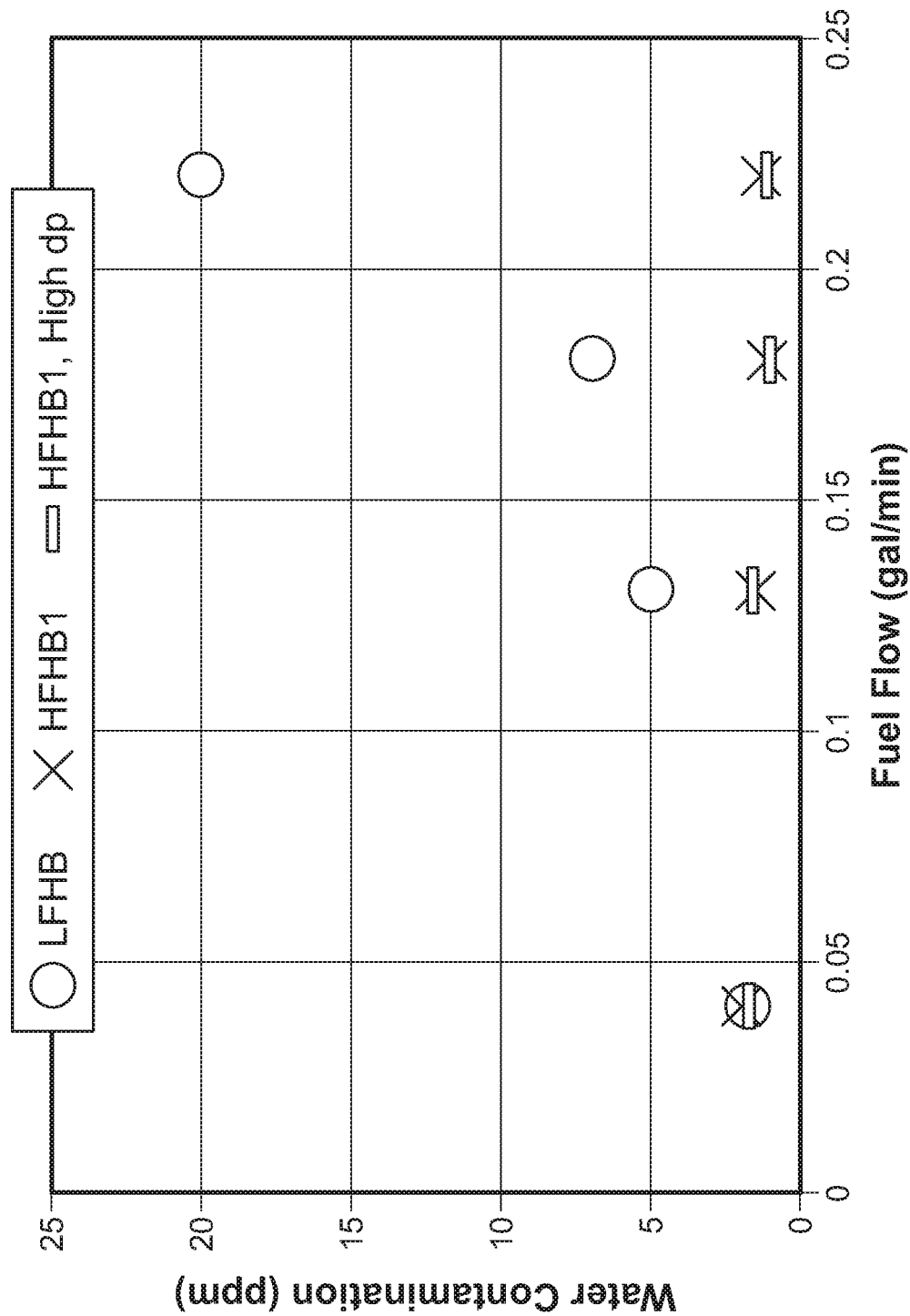
FIG. 3 is a graph of water contamination performance data for hydrophobic membranes at various fuel flow rates, as discussed in the Examples.

The water contamination performance was graphed against fuel flow rate in FIG. 3. The "HFHB1, high dP" data was taken from Table 3. This data indicates that the HFHB1 membrane shows negligible water contamination at all flow rates. While the LFHB membrane showed acceptable performance at very low flow rate, emulsified water passed through the membrane at high flow rate. HFHB1 even shows good water removal at high flow rates when starting at high dP similar to the LFHB membrane.

As illustrated in FIG. 3, the LFHB membrane shows poor water contamination performance at high flow rates. The HFHB1 membrane shows good water removal performance at all conditions.

Figure 4:
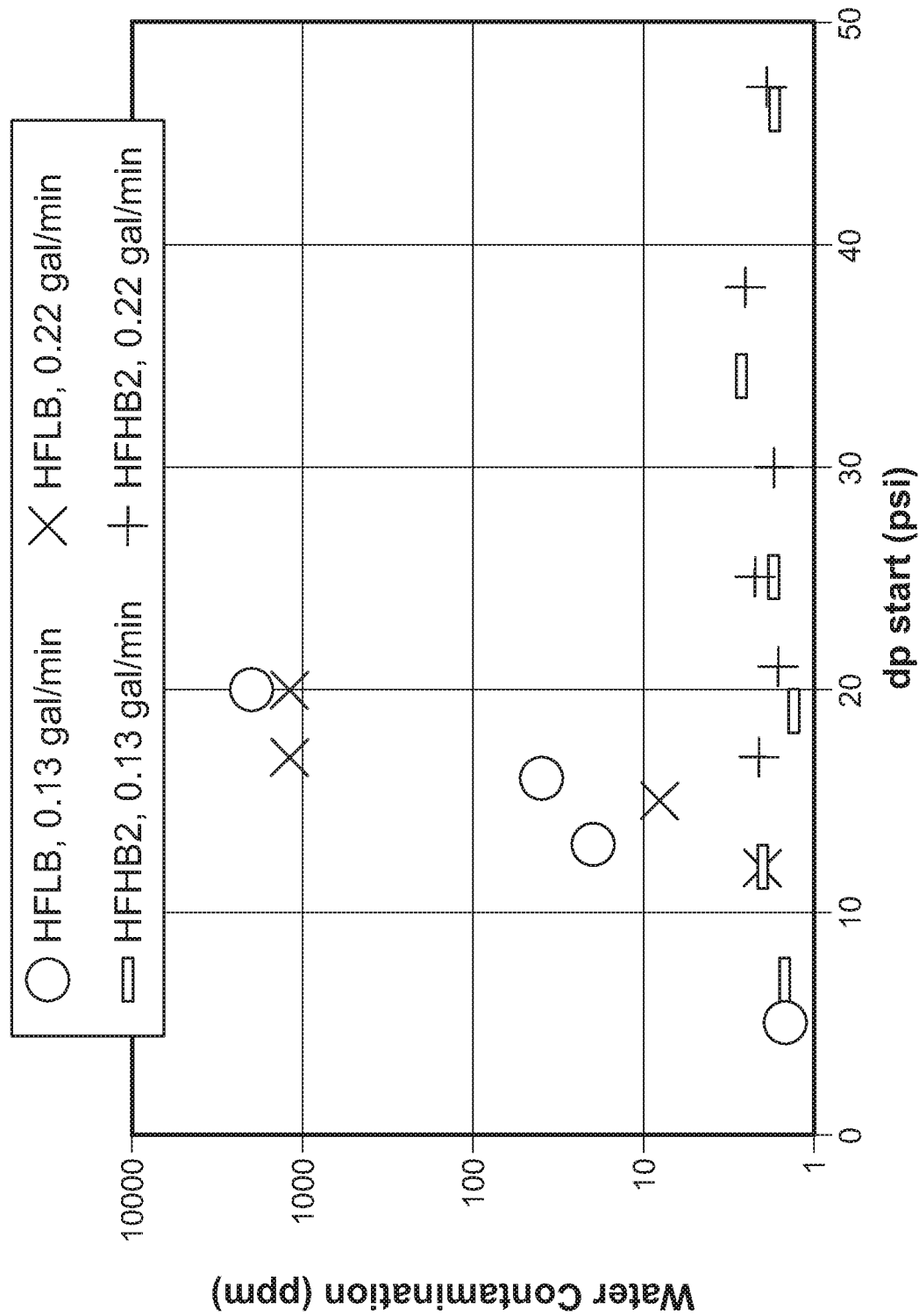
FIG. 4 is a graph of water contamination performance data for hydrophobic membranes at various differential pressure levels, as discussed in the Examples.

The water contamination performance was graphed (on a log scale) against "dP start" in FIG. 4. The HFLB membrane showed good initial performance. However, as water built up upstream of the membrane, the differential pressure increased, and water contamination occurred. The differential pressure reached a maximum at 20 psi. The water contamination at this point was >60 ppm, the maximum that can be measured with the Aqua Glo water detector. Additionally, using the bubble point of the membrane and the water/fuel interfacial surface tension, 20 psi is approximately the pressure at which bulk water should be forced through the membrane. Therefore, it is likely that when a pressure differential of 20 psi is reached, there is no filtration occurring, and any water entering the filter is passing through the HFLB membrane. In FIG. 4, points where the Aqua Glo read out >60 ppm water, the calculated value of water entering the system is graphed: 2,035 ppm for the 0.13 gal/min flow rate and 1,203 ppm for the 0.22 gal/min flow rate. There appears to be a performance cliff between approximately 5 psi and 15 psi where high water contamination occurs. Because the pressure would not increase beyond 20 psi, the backpressure regulator never vented water. The HFHB2 membrane showed low water contamination at all points tested, and when the differential pressure reached 50 psi, the backpressure regulator vented water.

As illustrated in FIG. 4, the HFLB and LFHB membranes are not robust to water contamination at high pressure, and show a performance cliff above approximately 5 psi. The HFHB1 and HFHB2 membranes were robust to water contamination at all pressures tested.

Advantageously, this data also indicates that the backpressure regulator can be set to open at pressures significantly higher than the pressure required to flow fuel through the system. For example, for the HFLB membrane, the backpressure regulator is limited to a cracking pressure of less than approximately 5-15 psi to ensure low water contamination. The HFHB1 and HFHB2 membranes operate robustly for water removal with a cracking pressure of 50 psi. The cracking pressure is defined as the pressure at which the backpressure regulator opens 5-150 psi. This cracking pressure is the differential pressure between the first conduit 18 and the third conduit 30. This cracking pressure is advantageous for several reasons. (1) A high cracking pressure on the backpressure regulator allows for a robust system. The system is robust to high pressure head generated by a tall fuel tank. The system is also robust to process upsets from pumps or other equipment. (2) Water collects at the bottom of the filter housing, blinding fuel flow through the membrane, and increasing the differential pressure until the cracking pressure is reached. A high cracking pressure requires the membrane to be largely blinded, resulting in a relatively large volume of water in the system. This is advantageous because every time the regulator cracks open, it is possible for fuel to rush out of the system with the water. A large amount of water in the system minimizes this possibility. (3) Because a relatively large amount of water is built up and vented each time the regulator cracks open, there are fewer instances of venting for a given volume of water. This allows more time for emulsified water to separate and can improve fuel-water separation performance.

Many existing pumps used with fuel tanks are designed to provide flow at differential pressures up to 15 psi. Therefore, the membrane should, at a minimum, protect from water contamination at a differential pressure of 15 psi to ensure robust water removal. Per the EI standards for fuel being pumped onto aircrafts, water is considered removed if the contamination is below 15 ppm. The data from all of the experiments is graphed in FIG. 5. One can see that an ePTFE membrane with a bubble point of 37.4 psi ensures water removal at a differential pressure of 15 psi. Interpolating between robust water removal at (11.2 psi BP, 6.5 psi dP) and (37.4 psi BP, 29.5 psi dP), a membrane with a bubble point above 20.9 psi is expected to robustly remove water at 15 psi dP.

Figure 5:
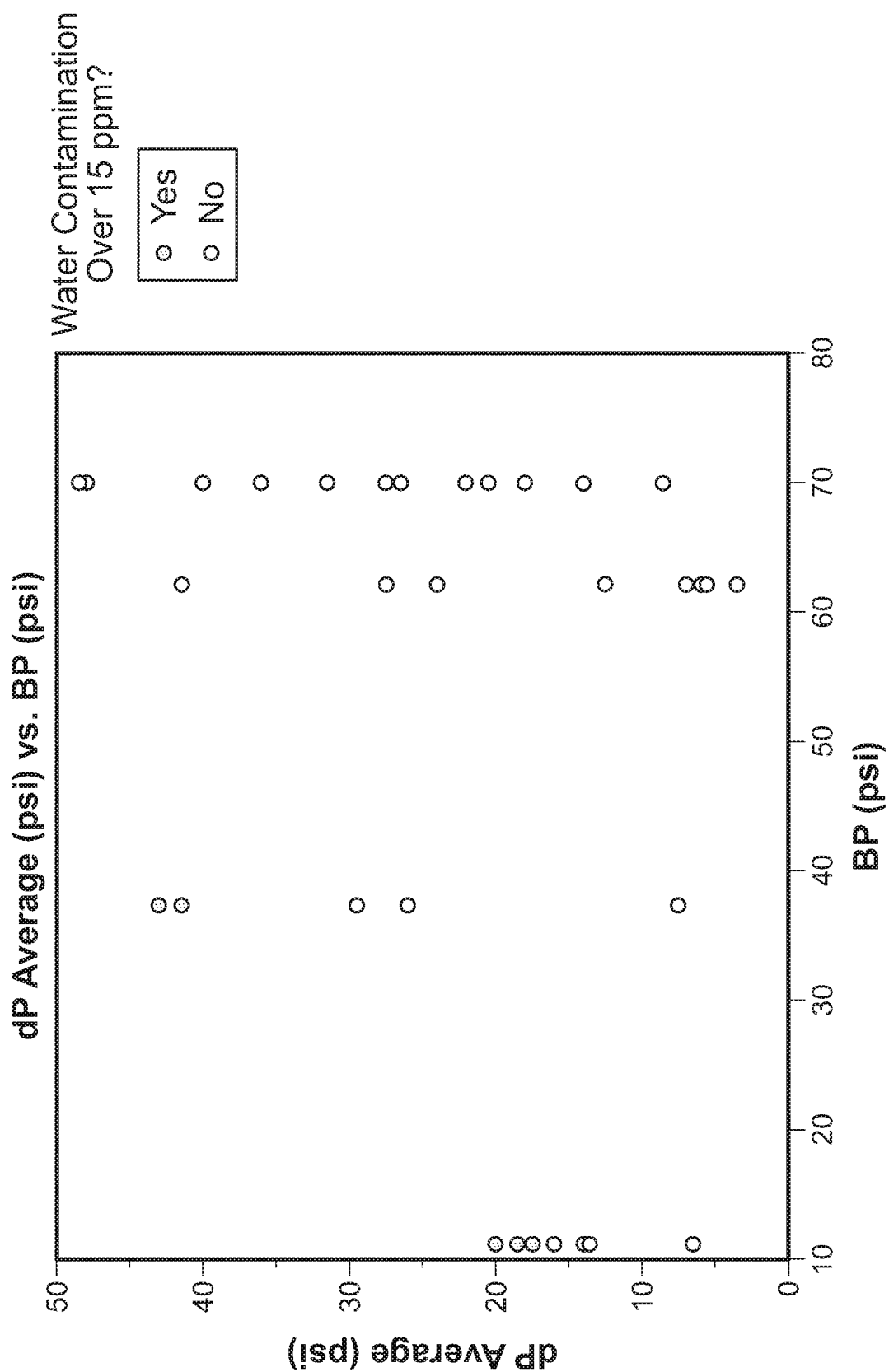
FIG. 5 is a graph of water contamination at various differential pressure levels for hydrophobic membranes at several bubble points, as discussed in the Examples.

FIG. 5 is a graph of all the data. The vertical axis is the average of "dP Start" and "dP End", since the sample was collected over that range of differential pressure. Samples with water contamination greater than 15 ppm are shown in red.

A typical fuel tank may be 10,000 gallons and it may be desirable to drain such a fuel tank in 60 minutes. A typical 10" long, 2" diameter pleated ePTFE filter element has approximately 1 m² of membrane area, such that a housing with ten elements has a membrane surface area of 10 m². To achieve this draining, the system would need to flow at 16.67 GPM m$^{-2}$. At a differential pressure of 15 psi, the minimum membrane jet fuel permeability is 1.11 GPM psi-1 m$^{-2}$. This correlates to a membrane airflow of 0.92 Fraizer, as shown below.

Figure 6:
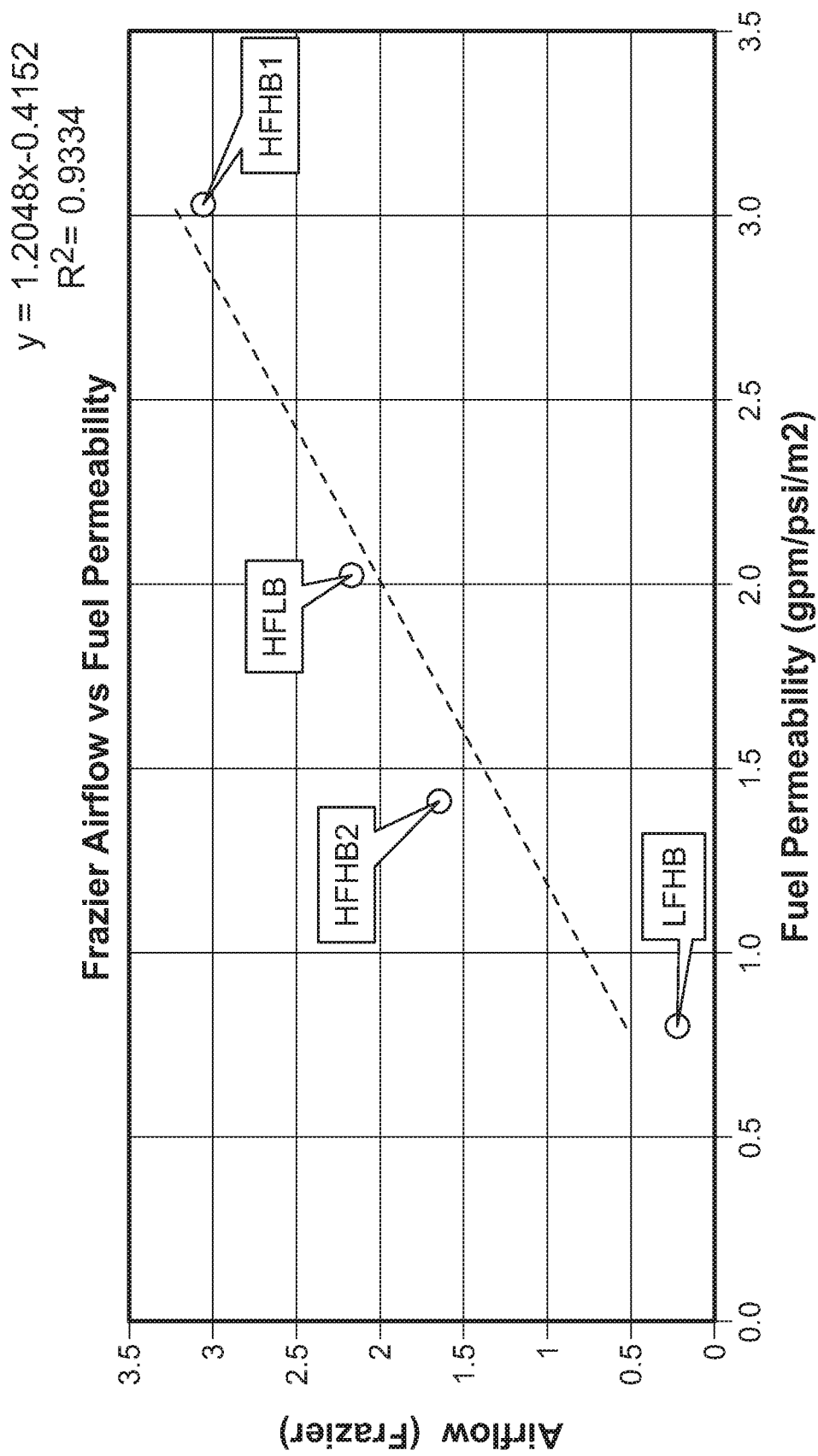
FIG. 6 is a graph of Frazier airflow data for hydrophobic membranes at various fuel permeabilities, as discussed in the Examples.

The jet fuel permeability was correlated to the Frazier airflow by the following method. A linear regression was performed on the fuel flow and "dP start" values from Table 2. Using a membrane area of 63.6 cm², the membrane fuel permeability was calculated, as shown in FIG. 6 for the LFHB and HFHB1 membranes. A similar linear regression was performed for the value of "dP start" at the beginning of each flow rate in Table 4. Using a membrane area of 63.6 cm², the membrane fuel permeability was calculated, as shown in FIG. 6 for the HFLB and HFHB2 membranes.

As illustrated in FIG. 6, the Frazier airflow of each membrane is correlated to the calculated jet fuel permeability. A jet fuel permeability of 1.11 GPM psi$^{-1}$ m$^{-2}$ correlates to an airflow of 0.92 Frazier.

SUMMARY

Figure 7:
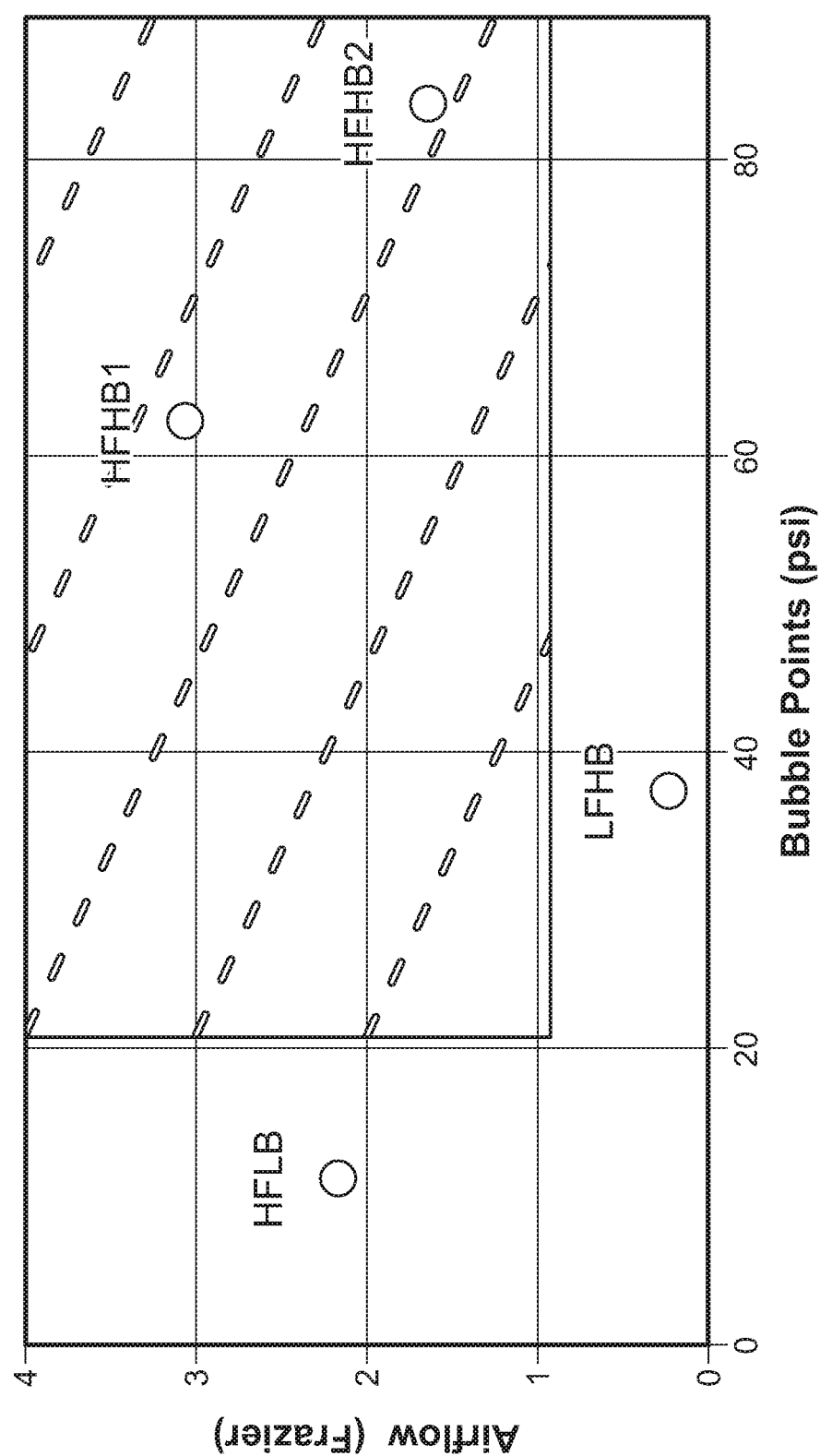
FIG. 7 is a graph of Frazier airflow data for hydrophobic membranes at various bubble points, as discussed in the Examples.

FIG. 7 is a graph showing the flow and bubble point of all membranes tested. The area shaded in blue represents the lower limits/ranges of flow and bubble point for membranes to be used in the systems disclosed herein. Many pumps provide flow up to pressures of 15 psi. To ensure that water is removed to below 15 ppm at a differential pressure of 15 psi, the membrane should have a bubble point of at least 20.9 psi (vertical line). To ensure a tank can be drained in a reasonable amount of time, the membrane should also have an airflow of at least 0.92 Fraizer (horizontal line).

The high flow nature of the high flow/high bubble membranes allows low starting differential pressure. The high bubble point nature of the high flow/high bubble membranes allows for a high cracking pressure on the backpressure regulator such as, for example, between 5 psi and 150 psi. In an embodiment, the cracking pressure is between 10 psi and 125 psi. In another embodiment, the cracking pressure is between 20 and 100 psi. In another embodiment, the cracking pressure is between 30 and 75 psi. In another embodiment, the cracking pressure is between 40 and 50 psi. In another embodiment, the cracking pressure is between 50 and 100 psi. In another embodiment, the cracking pressure is between 75 and 150 psi. In another embodiment, the cracking pressure is between 100 and 140 psi. In another embodiment, the cracking pressure is between 125 and 145 psi. This combination allows for large changes in differential pressure while maintaining robust fuel filtration and water venting.

The high flow/high bubble point membranes are advantageous compared to the low flow/high bubble membrane. At high flow rate, the low flow/high bubble point membrane built high differential pressure and had high water contamination. The high flow/high bubble point membranes had low water contamination for all flow rates, even at similar high differential pressure.

The high flow/high bubble point membranes are also advantageous compared to the high flow/low bubble point membrane. The high flow/low bubble point membrane had water contamination when water accumulated upstream of the membrane. Also, pressure could not build up enough to vent the water from the system. The high flow/high bubble point membranes had low water contamination even with water accumulation upstream of the membrane and could vent the water from the system at 50 psi.

As used herein, the conjunction "and" is intended to be inclusive and the conjunction "or" is not intended to be exclusive unless otherwise indicated. For example, the phrase "or, alternatively" is intended to be exclusive.

The use of the terms "a", "an", "the", or similar referents in the context of describing the invention (especially in the context of the claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

As used herein, the term "about" refers to a degree of deviation typical for a particular property, composition, amount, value or parameter as identified; such as deviations based on experimental errors, measurement errors, approximation errors, calculation errors, standard deviations from a mean value, routine minor adjustments, and so forth.

Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as", "for example") provided herein, is intended merely to better illuminate the invention and does not pose a limitation on the scope of the invention unless otherwise claimed.

Systems and methods for fuel tank draining and polishing have been described above both generically and with regard to specific embodiments. It will be apparent to those skilled in the art that various modifications and variations can be made in the embodiments without departing from the scope of the disclosure. Thus, it is intended that the embodiments cover modifications and variations provided they come within the scope of the appended claims and their equivalents.

What is claimed is:

1. An assembly comprising:
    a backpressure regulator including a check valve,
        wherein the backpressure regulator is configured to open when pressure of a mixture upstream of the backpressure regulator exceeds a predetermined setpoint, wherein the backpressure regulator is configured to open when a cracking pressure on the backpressure regulator exceeds a predetermined setpoint between 5 psi to 150 psi,
        wherein the predetermined setpoint is determined by a combination of a bubble point pressure of the hydrophobic membrane and an airflow of the hydrophobic membrane, wherein the determining airflow of the hydrophobic membrane is between 0.92 Frazier and 40 Frazier, and wherein the determining bubble point pressure of the hydrophobic membrane is between 20.9 psi and 500 psi;

a first conduit;

a hydrophobic membrane comprising ePTFE upstream of the backpressure regulator and downstream of the first conduit,
   wherein the mixture comprises an organic phase liquid and an aqueous phase;

at least one pump,
   wherein the backpressure regulator is configured to be fluidically connected to and downstream of the first conduit, and to at least one pump operably connected to and upstream of the first conduit;

a second conduit,
   wherein the hydrophobic membrane is configured to be fluidically connected to and upstream of the second conduit, and
   wherein the second conduit is configured to transport the organic phase liquid downstream of the hydrophobic membrane; and a third conduit,
   wherein the backpressure regulator is configured to be fluidically connected to and upstream of the third conduit and the third conduit is configured to be downstream the first conduit, and
   wherein the third conduit is configured to transport water downstream of the backpressure regulator.

2. The assembly of claim 1, wherein the second conduit is fluidically connected to a clean fuel collection vessel.

3. The assembly of claim 1, wherein the second conduit is fluidically connected to a vessel for the mixture, whereby filtered fuel is returned to the vessel.

4. The assembly of claim 3, wherein the vessel is selected from a group consisting of a fuel tank, a fuel filter housing, and a fuel supply system.

5. The assembly of claim 1, wherein the organic phase liquid is selected from a group consisting of a fuel, a biofuel and an insulating oil.

6. The assembly of claim 1, wherein the backpressure regulator includes a diaphragm valve.

7. The assembly of claim 1, wherein the backpressure regulator is integrated into one of a tank, a pump, or a housing.

8. The assembly of claim 1, wherein the aqueous phase is a non-dissolved water.

9. The assembly of claim 1, wherein the hydrophobic membrane is configured to block the flow of water therethrough.

10. The assembly of claim 1, wherein the determining airflow of the hydrophobic membrane is between 5 Frazier and 40 Frazier.

11. The assembly of claim 1, wherein the predetermined setpoint between 50 psi to 150 psi.

12. A system comprising:

a vessel configured to receive a mixture,
   wherein the mixture includes an organic phase liquid and an aqueous phase;

a first conduit fluidically connecting the vessel to a hydrophobic membrane;

wherein the hydrophobic membrane comprises ePTFE;

at least one pump operably connected to and upstream of the first conduit,
   wherein the at least one pump is configured to transport a mixture from the vessel to the hydrophobic membrane through the first conduit;

a second conduit fluidically connected to and downstream of the hydrophobic membrane;

a third conduit downstream of the first conduit and upstream of the hydrophobic membrane; and a backpressure regulator including a check valve, fluidically connected to and upstream of the third conduit, and fluidically connected to and downstream of the first conduit,
   wherein the backpressure regulator is configured to open when pressure of a mixture upstream of the backpressure regulator exceeds a predetermined setpoint,
   wherein the backpressure regulator is configured to open when a cracking pressure on the backpressure regulator exceeds a predetermined setpoint between 5 psi to 150 psi,
   wherein the predetermined setpoint is determined by a combination of a bubble point pressure of the hydrophobic membrane and an airflow of the hydrophobic membrane, wherein the determining airflow of the hydrophobic membrane is between 0.92 Frazier and 40 Frazier, and
   wherein the bubble point pressure of the hydrophobic membrane is between 20.9 psi and 500 psi.

13. The system of claim 12,
wherein the hydrophobic membrane is configured to block the flow of water therethrough.

* * * * *